United States Patent [19]

Blanpain et al.

[11] 4,212,362

[45] Jul. 15, 1980

[54] DEVICE FOR CAUSING TRANSLATION OF A TRACKED MACHINE

[75] Inventors: Guy Blanpain, Verneuil. en. Halatte; Pierre Grandfils, Précy-sur-Oise, both of France

[73] Assignee: Charbonnages de France, Paris, France

[21] Appl. No.: 946,055

[22] Filed: Sep. 25, 1978

[30] Foreign Application Priority Data

Oct. 7, 1977 [FR] France .............................. 77 30301

[51] Int. Cl.² .......................................... B62D 11/04
[52] U.S. Cl. .................................. 180/6.48; 180/9.44; 305/13
[58] Field of Search ...................... 180/6.48, 6.7, 6.44, 180/8, 9.44; 89/40 B, 41 H, 41 R, 36 H; 305/13, 39, 57, 58 R, 58 PC

[56] References Cited

U.S. PATENT DOCUMENTS

| | | | |
|---|---|---|---|
| 2,966,828 | 1/1961 | Berge | 180/8 X |
| 2,990,900 | 7/1961 | Pälsson | 180/6.48 |

FOREIGN PATENT DOCUMENTS 766811  1/1957  United Kingdom .

*Primary Examiner*—John J. Love
*Assistant Examiner*—Donn McGiehan
*Attorney, Agent, or Firm*—Cushman, Darby & Cushman

[57] ABSTRACT

A device for causing translation of a machine carried on a sledge surrounded by an articulated track comprises a pushing member provided on a jack supported by the sledge, the pushing member cooperating with abutments provided on the inside of the track. The track comprises a plurality of articulated shoes each formed of two L-shaped half-shoes fastened together so that the shorter branches thereof are spaced from one another and are substantially parallel to the direction of movement of the track. Each abutment is carried by the shorter branches of each shoe whereby the passage formed by the space between the two shorter branches is at a position corresponding to that of the respective abutment.

4 Claims, 4 Drawing Figures

U.S. Patent  Jul. 15, 1980  4,212,362
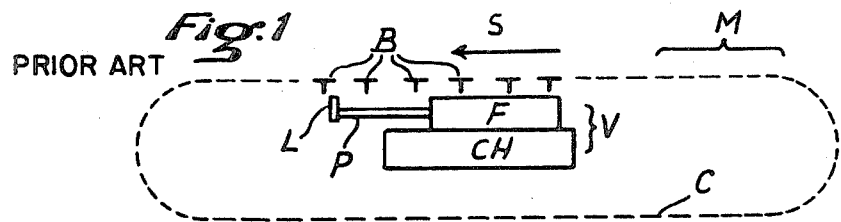

DEVICE FOR CAUSING TRANSLATION OF A TRACKED MACHINE

BACKGROUND OF THE INVENTION

1. Field of the Invention

The invention relates to a device for causing translation of a tracked machine, that is, of a machine carried on a sledge or platform surrounded by an articulated track.

2. Discussion of the Prior Art

British Pat. No. 766,811 describes a self-propelling device for moving an ore cutting machine M carried by articulated tracks C in the direction S, said device being illustrated diagrammatically in FIG. 1 of the present patent application. The device comprises a hydraulic ram V whose cylinder F is fastened to the chassis or sledge CH of the machine and the end of whose piston P is provided with a pushing pawl L which during the extension of the piston P comes to bear against abutments B disposed regularly on the inner face of the corresponding articulated track.

When applied to machines working in a muddy, pebbly, detrital, or dusty medium, such as mineworkings or other underground workings, this device has the disadvantage that the cooperation of the pushing pawl and abutments is seriously affected, to such an extent that there is a danger of disturbances in the operation of the device.

It is an object of the invention to propose a new device in which it can be assured that the pushing means P will actually come completely into contact with each abutment B despite the almost inevitable presence of ore debris in the proximity of the abutments.

SUMMARY OF THE INVENTION

According to the present invention there is provided a device for causing translation of a machine comprising a sledge for carrying the machine and an articulated track surrounding said sledge, said track comprising a plurality of shoes articulated to one another, and further comprising a jack carried by the sledge and a pushing member provided at the end of the piston rod of the jack and arranged to cooperate with a plurality of abutments provided inside the track, wherein one of the abutments is provided on each of said shoes and wherein each shoe is provided with two spaced parallel branches provided on the central interior portion of the track and extending toward the sledge, the respective abutment being provided at the ends of said branches, and a passage extending through the track adjacent said abutment is defined between said branches.

In a device of the invention, materials are pushed back by the pushing member is provided with a kind of storage space, from which it will be effectively driven out on the turning over. Furthermore, such material is also offered substantial facilities for lateral discharge on each side of the branches.

According to an embodiment of the invention, each of the shoes carrying the abutments comprises two L-angle half-shoes each having a longer branch and a shorter branch, the longer branches forming the sole of the shoe. Connecting means fasten the two half-shoes together and hold the two shorter branches spaced apart, opposite one another, and substantially parallel to the direction of movement of the track, the shorter branches of the angle carrying the abutments and the space between them constituting the passage.

It is advantageous and economical for each of the abutments to be formed by two mutually facing slots provided on each of the facing shorter branches of the angle.

In an advantageous embodiment the two half-shoes are held spaced apart by means of members constituting articulation pins for the shoes and for links connecting two successive shoes, and the passage aperture is thus obtained through the spacing of the two half-shoes constituting a shoe.

BRIEF DESCRIPTION OF THE DRAWINGS

An embodiment of the present invention will hereinafter be described, by way of example, with reference to the accompanying drawing in which:

FIG. 1 shows a side elevation of a prior art device as described in British Pat. No. 766,811;

FIG. 2 is a partial plan view, partly in section on the line II—II of FIG. 3, of the interior of a track of a device according to the invention;

FIG. 3 is a cross-section on the line III—III in FIG. 2 of the track shown in FIG. 2, and FIG. 4 is a diagrammatic section showing the connection between the jack and the track.

DESCRIPTION OF A PREFERRED EMBODIMENT

The track according to the invention, of which a portion is shown in FIGS. 2 to 4, comprises a series of shoes 1 connected together by links 2.

Each shoe assembly 1 is formed of two half-shoes 3, each of which is L-shaped and has a longer branch 4 which extends perpendicular to the direction of movement F of the track on each side of the chassis or sledge of the machine which is to be moved. The shorter branch 5 of each half-shoe 3 is disposed parallel to the said direction F.

In the embodiment shown in FIGS. 2 to 4, the shorter branches 5, which are disposed directly opposite one another, are rigidly connected in a spaced position by two pins 6 which pass through them near their ends and on which the links 2 are articulated.

A slot 7 of suitable shape is formed in each shorter branch 5, and the pair of slots disposed facing one another constitutes the abutment against which a pushing member 8 carried by the end of the piston of a driving jack 9 comes to bear during the driving phase of the jack, on one slot of a shoe resting on the ground.

When the pushing member comes into engagement with the slots 7, any debris which may be present in the slots can be discharged by the action of the pushing member, and pushed, on the one hand to each side of the shorter branches, and on the other hand into the opening 10 between the said shorter branches, so that the pushing member 8 is correctly engaged in the slots 7.

It is obvious that in order to enable the pushing member 8 to move out of the slots on the retraction of the jack piston, the cylinder of the jack is pivotally connected at joint 11 to a part 12 of the chassis or sledge of the machine.

We claim:

1. A device for causing translation of a machine comprising a sledge for carrying the machine and an articulated track surrounding said sledge, said track comprising a plurality of shoes articulated to one another, each shoe comprising two L-angle half-shoes each having a longer branch and a shorter branch and connecting means fastening the two half-shoes together and holding the two shorter branches spaced apart from one another and substantially parallel to the direction of movement of the track, and further comprising a jack carried by the sledge, and a pushing member provided at the end of the piston rod of the jack and arranged to cooperate with a plurality of abutments provided inside the track, wherein each abutment is carried by the shorter branches of each shoe and the space between the shorter branches forms a passage in the track.

2. A device according to claim 1, wherein a slot is formed in each said shorter branch, and wherein both such slots of the respective two shorter branches of each shoe face each other and together form one of said abutments.

3. A device according to claim 1, in which the two half-shoes of each shoe are held in the spaced position in relation to one another by members constituting articulation pins for the shoes and by links joining two successive shoes, and the passage is obtained through the spacing of the two half-shoes constituting a shoe.

4. A device for causing translation of a machine comprising a sledge for carrying the machine and an articulated track surrounding said sledge, said track comprising a plurality of shoes articulated to one another, and further comprising a jack carried by the sledge and a pushing member provided at the end of the piston rod of the jack and arranged to cooperate with a plurality of abutments provided inside the track, wherein one of the abutments is provided on each of said shoes, and wherein each shoe is provided with two spaced parallel branches provided on the central interior portion of the track and extending towards the sledge, the respective abutment being provided at the ends of said branches, and a passage extending through the track adjacent said abutment is defined between said branches.

* * * * *